US011132602B1

(12) United States Patent
Xie et al.

(10) Patent No.: US 11,132,602 B1
(45) Date of Patent: Sep. 28, 2021

(54) EFFICIENT ONLINE TRAINING FOR MACHINE LEARNING

(71) Applicant: Twitter, Inc., San Francisco, CA (US)

(72) Inventors: Zhiyong Xie, San Francisco, CA (US); Yue Lu, Redwood City, CA (US); Pengjun Pei, Santa Clara, CA (US); Gary Lam, Millbrae, CA (US); Shuanghong Yang, Fremont, CA (US); Yong Wang, Millbrae, CA (US); Ziqi Huang, Mountain View, CA (US); Xiaojiang Guo, Los Altos, CA (US); Van Lam, New York City, NY (US); Lanbo Zhang, Millbrae, CA (US); Bingjun Sun, Los Altos, CA (US); Sridhar Iyer, Sunnyvale, CA (US); Sandeep Pandey, San Francisco, CA (US); Qi Li, Foster City, CA (US); Dong Wang, Palo Alto, CA (US)

(73) Assignee: Twitter, Inc., San Francisco, CA (US)

(*) Notice: Subject to any disclaimer, the term of this patent is extended or adjusted under 35 U.S.C. 154(b) by 1023 days.

(21) Appl. No.: 15/675,696

(22) Filed: Aug. 11, 2017

Related U.S. Application Data

(60) Provisional application No. 62/373,946, filed on Aug. 11, 2016.

(51) Int. Cl.
*G06N 3/08* (2006.01)
*G06N 20/00* (2019.01)
*G06N 3/04* (2006.01)

(52) U.S. Cl.
CPC ............ *G06N 3/08* (2013.01); *G06N 3/04* (2013.01); *G06N 20/00* (2019.01)

(58) Field of Classification Search
CPC .......... G06N 3/08; G06N 20/00; G06F 30/27; G06F 16/27; G06F 11/3006
(Continued)

(56) References Cited

U.S. PATENT DOCUMENTS 8,027,938 B1 * 9/2011 Xu ..................... G06N 20/00
706/12
9,218,573 B1 * 12/2015 Corrado ................ G06N 3/08
(Continued)

FOREIGN PATENT DOCUMENTS

CN    104980518 A  * 10/2015
CN    106156810 B  * 12/2019

OTHER PUBLICATIONS

Wei et al., "Managed Communication and Consistency for Fast Data-Parallel Iterative Analytics" Aug. 27-29, 2015, pp. 1-14. (Year: 2015).*
(Continued)

*Primary Examiner* — Michael J Huntley
*Assistant Examiner* — Chase P. Hinckley
(74) *Attorney, Agent, or Firm* — Brake Hughes Bellermann LLP

(57) ABSTRACT

An example system includes prediction workers, training workers, and a parameter server. The prediction workers store a local copy of a machine-learned model and run the mode exclusively in serving mode. The training workers store a local copy of a machine-learned model and a local snapshot and run the local copy exclusively in training mode and compare the local model or state to the snapshot after training to send delta updates to the parameter server after training. The parameter server aggregates received delta updates into a master copy of the model, sends the aggregated updates back to training workers and provides two types of updates; a real-time update based on a comparison
(Continued)

of the master model with a local snapshot, and a full update. The real-time update occurs at least an order of magnitude more frequently than the full update and includes a subset of the weights in the model.

23 Claims, 4 Drawing Sheets

(58) Field of Classification Search
USPC .......................................................... 706/25
See application file for complete search history.

(56) References Cited

U.S. PATENT DOCUMENTS

| | | | | |
|---|---|---|---|---|
| 9,984,337 | B2* | 5/2018 | Kadav | G06F 16/1837 |
| 10,152,676 | B1* | 12/2018 | Strom | G06N 7/005 |
| 10,338,931 | B2* | 7/2019 | Gupta | H04W 56/001 |
| 10,474,951 | B2* | 11/2019 | Min | G06N 3/08 |
| 10,503,607 | B2* | 12/2019 | Zhang | G06F 12/1441 |
| 10,540,608 | B1* | 1/2020 | Dirac | G06N 20/00 |
| 10,579,750 | B2* | 3/2020 | McElhinney | G06F 9/50 |
| 10,643,150 | B2* | 5/2020 | Hack | G06N 20/00 |
| 10,671,916 | B1* | 6/2020 | Sundararaman | G06N 20/20 |
| 10,679,145 | B2* | 6/2020 | Kadav | G06N 20/00 |
| 10,733,535 | B1* | 8/2020 | Corrado | G06N 20/00 |
| 10,764,125 | B2* | 9/2020 | Zhang | H04L 41/0803 |
| 10,891,156 | B1* | 1/2021 | Zhao | G06N 20/00 |
| 10,922,620 | B2* | 2/2021 | Mytkowicz | G06N 20/00 |
| 2011/0320767 | A1* | 12/2011 | Eren | G06N 20/00 712/30 |
| 2015/0324686 | A1* | 11/2015 | Julian | G06N 20/00 706/25 |
| 2015/0324690 | A1* | 11/2015 | Chilimbi | G06N 3/08 706/25 |
| 2016/0103901 | A1* | 4/2016 | Kadav | G06F 16/1837 707/614 |
| 2016/0232445 | A1* | 8/2016 | Srinivasan | G06N 3/08 |
| 2017/0076198 | A1* | 3/2017 | Jin | G06N 3/08 |
| 2017/0091668 | A1* | 3/2017 | Kadav | G06N 20/00 |
| 2017/0109322 | A1* | 4/2017 | McMahan | G06N 20/00 |
| 2017/0213257 | A1* | 7/2017 | Murugesan | G06Q 30/0277 |
| 2017/0236072 | A1* | 8/2017 | Rendle | G06N 7/00 706/12 |
| 2017/0372232 | A1* | 12/2017 | Maughan | G06N 20/00 |
| 2018/0018590 | A1* | 1/2018 | Szeto | G06F 21/6254 |
| 2018/0039905 | A1* | 2/2018 | Anghel | G06F 9/50 |
| 2018/0189609 | A1* | 7/2018 | Park | G06K 9/00979 |
| 2018/0218287 | A1* | 8/2018 | Wang | G06N 20/00 |
| 2018/0232660 | A1* | 8/2018 | Kagian | G06Q 30/0254 |
| 2018/0300171 | A1* | 10/2018 | Qiao | G06F 9/5088 |
| 2018/0307972 | A1* | 10/2018 | Feng | G06N 3/063 |
| 2018/0307986 | A1* | 10/2018 | Kabul | G06N 3/0454 |
| 2018/0331897 | A1* | 11/2018 | Zhang | H04L 41/0803 |
| 2018/0336076 | A1* | 11/2018 | Lim | G06F 9/52 |
| 2018/0341801 | A1* | 11/2018 | Dai | G06K 9/623 |
| 2018/0349313 | A1* | 12/2018 | Ahn | G06F 9/50 |
| 2019/0026657 | A1* | 1/2019 | Zhou | G06F 9/5027 |
| 2019/0034833 | A1* | 1/2019 | Ding | G06K 9/6256 |
| 2019/0050743 | A1* | 2/2019 | Chen | G06N 20/20 |
| 2019/0147365 | A1* | 5/2019 | Yagnik | G06N 3/0454 706/12 |
| 2019/0197404 | A1* | 6/2019 | Wang | G06N 3/0454 |
| 2019/0220758 | A1* | 7/2019 | Talyansky | G06N 5/043 |
| 2019/0244135 | A1* | 8/2019 | Melamed | G06N 20/00 |
| 2019/0349266 | A1* | 11/2019 | Johnsson | H04L 41/0893 |
| 2020/0151606 | A1* | 5/2020 | Dirac | G06N 20/00 |

OTHER PUBLICATIONS

Kim et al., STRADS: "A Distributed Framework for Scheduled Model Parallel Machine Learning" Apr. 18-21, 2016, pp. 1-16. (Year: 2016).*

Alain et al., "Variance Reduction in SGD by Distributed Importance Sampling" Apr. 16, 2016, pp. 1-18. (Year: 2016).*
Nair et al., "Massively Parallel Methods for Deep Reinforcement Learning" Jul. 16, 2015, pp. 1-14. (Year: 2015).*
Li, Mu et al., "DiFacto—Distributed Factorization Machines" Feb. 22-25, 2016, pp. 377-386. (Year: 2016).*
Xie et al., "Lighter-Communication Distributed Machine Learning via Sufficient Factor Broadcasting" Jun. 2016, pp. 1-16. (Year: 2016).*
Jagerman et al., "Web-scale Topic Models in Spark: An Asynchronous Parameter Server" Jun. 17, 2016, pp. 1-9. (Year: 2016).*
Cui et al., "GeePS: Scalable deep learning on distributed GPUs with a GPU-specialized parameter server" Apr. 18-21, 2016. (Year: 2016).*
Wang, Wei, "A Training Framework and Architectural Design for Distributed Deep Learning" Jul. 24, 2016, Diss. National University of Singapore, pp. i-122. (Year: 2016).*
Zheng et al., "SpeeDO: Parallelizing Stochastic Gradient Descent for Deep Convolutional Neural Network" 2015, pp. 1-6. (Year: 2015).*
Kulkarni et al., "Hierarchical Deep Reinforcement Learning: Integrating Temporal Abstraction and Intrinsic Motivation" May 31, 2016, pp. 1-14. (Year: 2016).*
Zhang et al., "Splash: User-friendly Programming Interface for Parallelizing Stochastic Algorithms" Sep. 23, 2015, pp. 1-27. (Year: 2015).*
Li, Mu, "Scaling Distributed Machine Learning with System and Algorithm Co-design" Feb. 2017, Thesis Carnegie Mellon University, pp. i-160. (Year: 2017).*
Yang et al., "Husky: Towards a More Efficient and Expressive Distributed Computing Framework" Jan. 2016. (Year: 2016).*
Schelter et al., "Factorbird—a Parameter Server Approach to Distributed Matrix Factorization" Nov. 3, 2014, pp. 1-10. (Year: 2014).*
Sra et al., "AdaDelay: Delay Adaptive Distributed Stochastic Optimization" May 2, 2016, pp. 957-965. (Year: 2016).*
Zhang et al., "Hogwild++: A New Mechanism for Decentralized Asynchronous Stochastic Gradient Descent" 2016. (Year: 2016).*
Teh et al., "Distributed Bayesian Learning with Stochastic Natural-gradient Expectation Propagation and the Posterior Server" Dec. 31, 2015, pp. 1-30. (Year: 2015).*
Aytekin et al., "Analysis and Implementation of an Asynchronous Optimization Algorithm for the Parameter Server" Oct. 18, 2016, pp. 1-10. (Year: 2016).*
Wang et al., "Parallel and Distributed Block-Coordinate Frank-Wolfe Algorithms" Feb. 13, 2016, pp. 1-36. (Year: 2016).*
Ordentlich et al., "Network-Efficient Distributed Word2vec Training System for Large Vocabularies" Jun. 27, 2016. (Year: 2016).*
Bose et al., "Probabilistic Demand Forecasting at Scale" Aug. 1, 2017, pp. 1694-1705. (Year: 2017).*
Sun et al., "Timed Dataflow: Reducing Communication Overhead for Distributed Machine Learning Systems" 2016, pp. 1110-1117. (Year: 2016).*
Xie et al., "CuMF_SGD: Parallelized Stochastic Gradient Descent for Matrix Factorization on GPUs" Jun. 26-30, 2017, pp. 79-92. (Year: 2017).*
Sparks et al., "TuPAQ: An Efficient Planner for Large-scale Predictive Analytic Queries" Mar. 8, 2015. (Year: 2015).*
Harlap et al., "Proteus: agile ML elasticity through tiered reliability in dynamic resource markets" Apr. 23-26, 2017. (Year: 2017).*
Watcharapichat et al., "Ako: Decentralized Deep Learning with Partial Gradient Exchange" Oct. 2016, pp. 84-97. (Year: 2016).*
Li et al., "Communication Efficient Distributed Machine Learning with the Parameter Server" 2014, pp. 1-9. (Year: 2014).*
Jiang et al., "Heterogeneity-aware Distributed Parameter Servers" May 14-19, 2017, pp. 463-478. (Year: 2017).*
Zhou et al., "KunPeng: Parameter Server based Distributed Learning Systems and Its Applications in Alibaba and Ant Financial" Aug. 13, 2017, pp. 1693-1702. (Year: 2017).*
Sun et al., "DPS: A DSM-based Parameter Server for Machine Learning" Jun. 21, 2017, pp. 20-27. (Year: 2017).*

(56) References Cited

OTHER PUBLICATIONS

Cheng et al., "TensorFlow Estimators: Managing Simplicity vs. Flexibility in High-Level Machine Learning Frameworks" Aug. 8, 2017. (Year: 2017).*
Huang et al., "Snapshot Ensembles: Train 1, Get M For Free" Apr. 1, 2017, pp. 1-14. (Year: 2017).*
Chaudhari et al., "Parle: Parallelizing Stochastic Gradient Descent" Jul. 3, 2017, pp. 1-12. (Year: 2017).*
Iandola et al., "FireCaffe: near-linear acceleration of deep neural network training on compute clusters" Jan. 8, 2016, pp. 1-13. (Year: 2016).*
Steinhardt et al., "Avoiding Imposters and Delinquents: Adversarial Crowdsourcing and Peer Prediction" Jun. 16, 2016, pp. 1-18. (Year: 2016).*
Boutsidis et al., "Optimal Principal Component Analysis in Distributed and Streaming Models" Jun. 2016, pp. 236-249. (Year: 2016).*
Zhang et al., "Deep Learning with Elastic Averaging SGD"Oct. 25, 2015, pp. 1-24. (Year: 2014).*
Jiang et al., "TencentBoost: A Gradient Boosting Tree System with Parameter Server" Apr. 19, 2017, pp. 281-284. (Year: 2017).*
Wu et al., "Socially-Driven Learning-Based Prefetching in Mobile Online Social Networks" Mar. 28, 2017, pp. 1-14. (Year: 2017).*
Gupta et al., "Model Accuracy and Runtime Tradeoff in Distributed Deep Learning: A Systematic Study" 2016, pp. 171-180. (Year: 2016).*
Chen, et al., "Revisiting Distributed Synchronous SGD", Proceedings of ICLR Workshop Track, available online at https://arxiv.org/pdf/1604.00981v2.pdf, Apr. 2016, 5 pages.
Dean, et al., "Large Scale Distributed Deep Networks", Neural Information Processing Systems, 2012, 11 pages.
Li, et al., "Communication Efficient Distributed Machine Learning with the Parameter Server", Neural Information Processing Systems, 2014, 16 pages.
Li, et al., "Parameter Server for Distributed Machine Learning", Big Learning NIPS Workshop, 2013, 10 pages.
Li, et al., "Scaling Distributed Machine Learning With the Parameter Server", Proceedings of OSDI, 2014, pp. 583-598.
Zhang, et al., "Deep learning with Elastic Averaging SGD", Neural Information Processing Systems, available online at https://arxiv.org/pdf/1412.6651.pdf, Oct. 25, 2015, 24 pages.

* cited by examiner

EFFICIENT ONLINE TRAINING FOR MACHINE LEARNING

RELATED APPLICATIONS

This application is a Non-Provisional of, and claims priority to, U.S. Provisional Application No. 62/373,946, titled "Data Science and Machine Learning at Scale," filed Aug. 11, 2016, the disclosure of which is incorporated herein by reference.

BACKGROUND

Machine learning is the field of study where a computer or computers learn to perform classes of tasks using the feedback generated from the experience or data that the machine learning process acquires during computer performance of those tasks. Typically, machine learning includes providing example inputs and desired output for training a machine learned model and, once the model has been trained, it can be used in a serving or serving mode to perform the task on a new, previously unseen, input. Many machine-learned models are trained offline, i.e., when the model is in a training mode and not available for serving. Some machine-learned models can be trained online, i.e., receiving training data and updating model parameters while in a serving mode.

SUMMARY

According to one aspect, a system includes at least one processor, a plurality of prediction workers, a plurality of training workers, and a parameter server. Each prediction worker is configured to store a respective local copy of a machine-learned model, receive a request from a client for a prediction, the request including input data, generate the prediction by running the input data through the model, and provide the request to the client. Each training worker is configured to store a respective local copy of the machine-learned model or a local copy of a state of the machine-learned model, store a respective snapshot of the machine-learned model or the state of the machine-learned model, receive a training example, train the local copy of the machine-learned model, and periodically send one or more delta updates to a parameter server after training by comparing the local copy of the machine-learned model or the local copy of the state with the snapshot. The parameter server is configured to receive the delta updates from the plurality of training workers, aggregate the delta updates into a master copy of the machine-learned model to generate aggregated updates, and send the aggregated updates back to training workers. The parameter server is further configured to, on a first periodic basis, determine a subset of weights for a real-time update, the subset being less than all of the weights for the master copy and the subset including weights having a change that satisfies a threshold, and provide the subset of weights as a real-time update to each of the plurality of prediction workers. On a second periodic basis, the parameter server is configured to provide a full update of the master copy to each of the plurality of prediction workers and to each of the plurality of training workers, the full update being used to replace each respective local copy. The first period occurs at least an order of magnitude more frequently than the second period.

In one aspect, a method includes receiving training data, providing the training data to an observation worker and to a training worker of a plurality of training workers, the observation worker and each of the training workers having a respective local copy of a machine-learned model, generating first metrics for the training data from the observation worker by running the training data through the respective local copy of the machine-learned model in an serving mode, generating second metrics for the training data from the training worker by running the training data through the a machine-learned model in a training mode, and sending an alert when a difference between the first metrics and the second metrics satisfies a threshold.

In one aspect, a method includes receiving delta updates from a training worker of a plurality of training workers. Each of the training workers is configured to store a respective local copy of a machine-learned model, store a respective snapshot of the machine-learned model, receive a training example, train the local copy of the machine-learned model, and periodically send one or more delta updates to a parameter server after training by comparing the local copy of the machine-learned model or a local state with the snapshot. The method also includes aggregating the delta update into a master copy of the machine-learned model and providing weights changed in the aggregating to the training worker. The method also includes, on a first periodic basis, determining a subset of weights for a real-time update, the subset being less than all of the weights for the master copy and the subset including weights having a change that satisfies a threshold and providing the subset of weights as a real-time update to each of a plurality of prediction workers, each of the plurality of prediction workers storing a respective local copy of the machine-learned model and running the respective local copy in an serving mode in response to a client request. The method also includes, on a second periodic basis, providing a full update of the master copy of the machine-learned model to each of the plurality of prediction workers and to each of the plurality of training workers, wherein the full update is used to replace each respective local copy. The first period occurs at least an order of magnitude more frequently than the second period.

Implementations can include one or more of the following benefits. For example, implementations can minimize network bandwidth utilized in online training by minimizing the training traffic sent over the network. For example, in a large system with many prediction servers (e.g., thousands), each copy of the prediction server needs a copy of the training traffic to keep its local copy version of the model up-to-date. This wastes bandwidth. Implementations split the training traffic among a much smaller set of training servers, so that a particular training example is sent once or a few times rather than thousands of times. As another example, implementations result in higher quality models because training traffic size is not restricted due to network bandwidth and process capacity of a single machine. For example, because training is distributed among a few training workers, there is no need to limit the size of the data used to train the models by downsampling the training data. As another example, implementations result in faster online training because training examples can be processed in parallel, so training is not limited to the capacity of a single computing device. For example, implementations can result in at least a 20 times more training traffic, which results in better quality models and models that can handle more complicated feature representation. As another example, implementations solve the problem of potential unintentional model degradation due to training workers having only partial training data and having the degraded model pushed to the prediction servers by utilizing an observation worker. The observation worker processes training example in an serving mode and can compare model quality metrics with metrics generated by the training workers and intervene in the online training process if the metrics indicate the model quality is beginning to deteriorate. As another example, implementations minimize network traffic utilized for real-time updates to the prediction servers by providing different kinds of model updates, e.g., a smaller and frequent real-time update, an on-demand initialization update, and a full but infrequent full update. As another example, the use of training models hosted at multiple machines, with each trainer on each machine only training a portion of the model, speeds up the training of the master model. In some cases, training speed can be 10 times faster.

BRIEF DESCRIPTION OF THE DRAWINGS

Like reference symbols in the various drawings indicate like elements.

DETAILED DESCRIPTION

Figure 1:
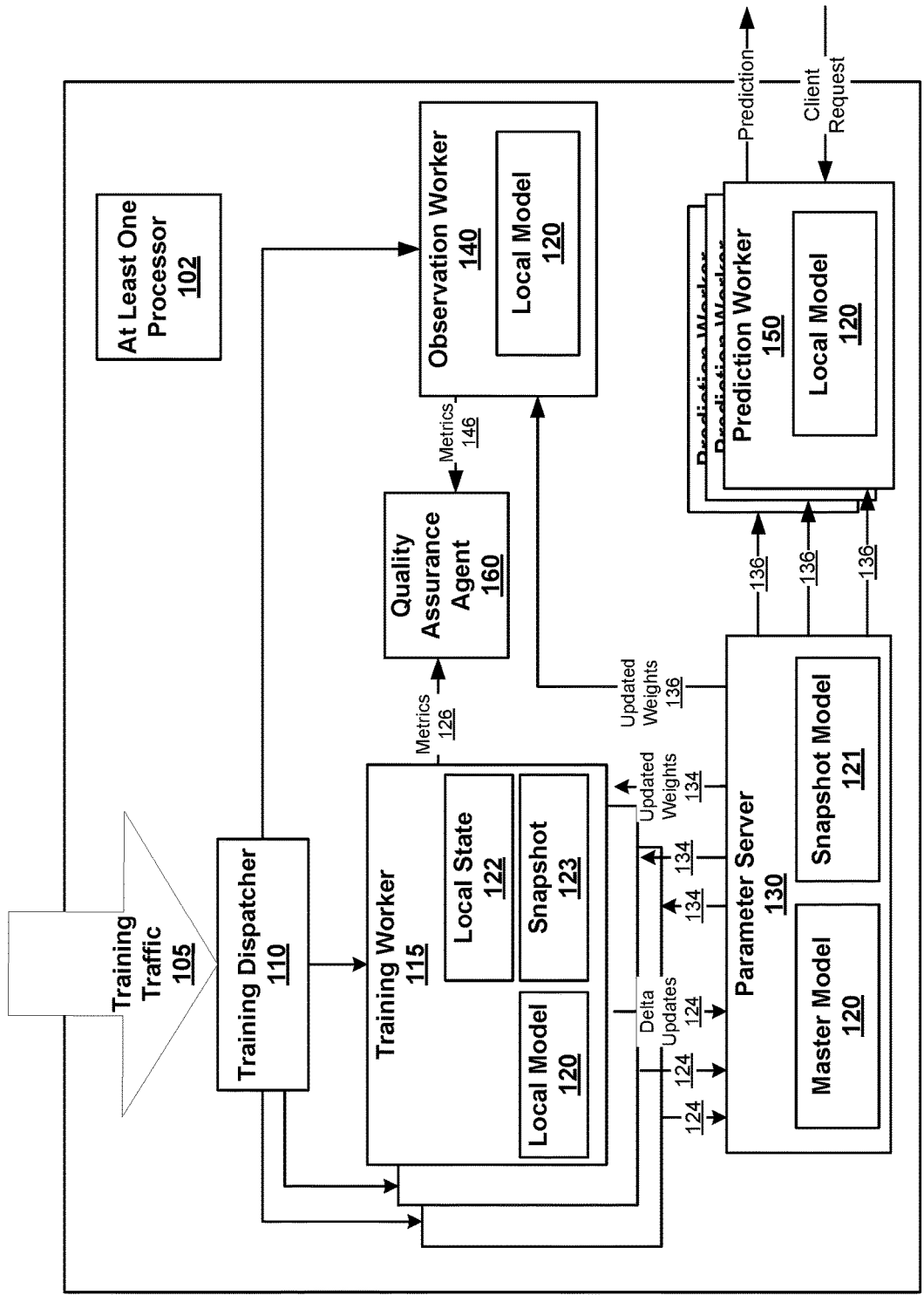
FIG. 1 is a schematic diagram of an example efficient online training system, according to an implementation.

FIG. 1 is a block diagram of an online training system 100 in accordance with an example implementation. The system 100 uses a parameter server for online training of a machine-learned model at reduced network traffic while increasing training examples and expanding feature representation. The system 100 partitions training traffic among training workers, each training worker training a local version of the model and/or state using the training traffic it receives. Each training worker identifies the delta updates by comparing the results (e.g., weights) with a snapshot version of the internal state and reports these delta updates to the parameter server. The parameter server collects the delta updates, aggregates them to generate weight changes, and distributes real-time updates, as well as initial, and full updates of the model. Concurrently with the training, an observation worker monitors the training workers and provides a warning when model metrics begin to diverge. To reduce network bandwidth, the workers are provided with a real-time update that includes only those weights that have large changes. A periodic full update of the model may be pushed at a much longer interval (e.g., every few hours). The parameter server may use a separate initial update to provide a worker with some updated weights when the worker comes back online. For ease of explanation, the online training system 100 may be referred to as operating in a social media environment, but implementations are not limited to this particular operating environment.

Figure 4:
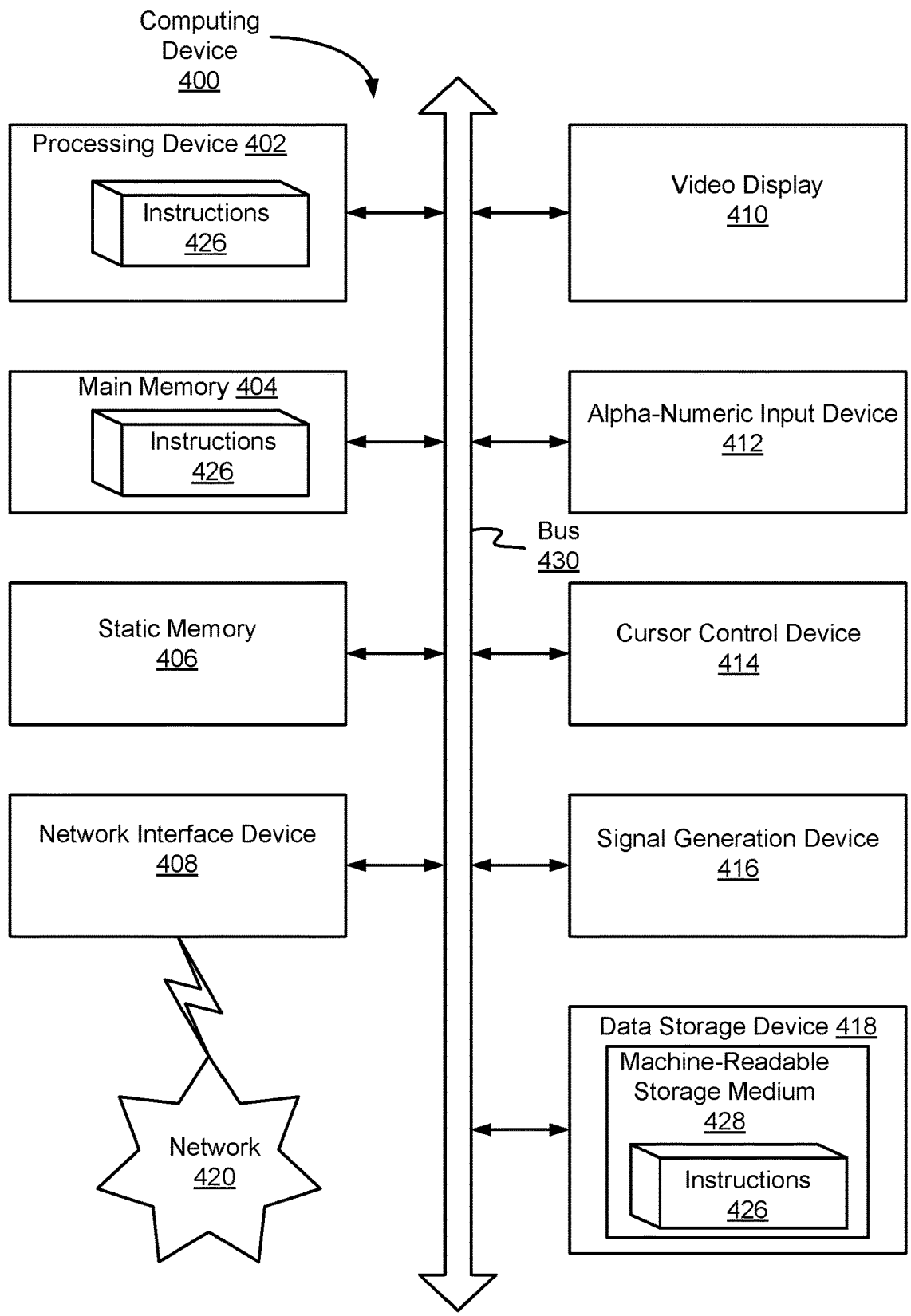
FIG. 4 is a is a schematic diagram of a machine in the example form of a computing device within which a set of instructions, for causing the machine to perform any one or more of the functions described herein, according to an implementation.

The online training system 100 may be a computing device or devices that take the form of a number of different devices, for example, a standard server, a group of such servers, or a rack server system. In addition, system 100 may be implemented in a personal computer, for example, a laptop computer. The online training system 100 may be an example of computer device 400, as depicted in FIG. 4.

The online training system 100 can include one or more processors 102 formed in a substrate configured to execute one or more machine executable instructions or pieces of software, firmware, or a combination thereof. The processors 102 can be semiconductor-based—that is, the processors can include semiconductor material that can perform digital logic. The online training system 100 can also include an operating system and one or more computer memories, for example, a main memory, configured to store one or more pieces of data, either temporarily, permanently, semi-permanently, or a combination thereof. The memory may include any type of storage device that stores information in a format that can be read and/or executed by the one or more processors. The memory may include volatile memory, non-volatile memory, or a combination thereof, and store modules that, when executed by the one or more processors, perform certain operations. In some implementations, the modules may be stored in an external storage device and loaded into the memory of system 100.

The online training system 100 includes training traffic 105. The training traffic 105 is training data that represents new examples of input and desired output that help keep the machine-learned model up to date. When the machine-learned model operates in a fast changing environment, the model must be trained with examples of how the environment is changing to avoid becoming stale and failing to adequately perform its task. An example of a fast-changing environment is a social media platform receiving thousands of new posts, messages, tweets, etc. every second. Because social media platforms operate in real-time and new trends, events, stories, etc. can crop up quickly, machine-learned prediction models benefit from constant, online training. The training traffic 105 is generated by some component connected to and communicating with system 100 and is provided to or made available to the system 100. The training traffic 105 may be large, e.g., tens of thousands of training examples per second.

The system 100 may include a training dispatcher 110. The training dispatcher 110 obtains training examples (the training traffic 105) from the source of the training examples. The source of the training examples is beyond the scope of this application, as it is well understood how to generate such examples. The training dispatcher 110 decides which of a plurality of training workers 115 to send the training example to. In some implementations the training dispatcher 110 uses a hashing function to divide the training examples in the training traffic 105 among the training workers 115. In some implementations, the training dispatcher 110 hashes a training example on a feature in the training example. In some implementations, the training dispatcher 110 shards a training example into different partitions to send to different workers. For example, in a social media environment the training dispatcher 110 may hash the training traffic 105 on features such as impression, keyword, author, etc. Hashing on a feature ensures that positive and negative training examples from the same case are sent to the same training worker, which improves the training process. Because the training dispatcher 110 divides the training traffic 105 among the training workers 115, the training dispatcher 110 does not have to sending a copy of each training example to all workers. In essence, regardless of the actual number of training workers 115, the training dispatcher 110 sends each training example much fewer times, which reduces network traffic and, therefore, puts less of a burden on network bandwidth. This also enables the system 100 to avoid having to downsample the training traffic 105. Such downsampling can adversely affect the quality of the model. The training dispatcher 110 may push each training example as it is hashed to the determined (assigned) training worker 115.

The system 100 may includes multiple training workers 115, e.g., 10, 35, 50, 80, etc. The number of training workers 115 depends on a trade-off between communication overhead and per-machine capacity load. In some implementations, an administrator may perform A/B testing to determine the preferred number of training workers. However, the number may be much smaller than the number of prediction workers 150. Each training worker 115 has a local copy of the model 120 and/or a local copy of the state 122 and a snapshot 123. In some implementations, the local copy of the model 120 is a full copy of the master model 120, i.e., has the same number of weights as the master model 120. In some implementations, the local model 120 has a subset of the weights, and each training worker 115 has a different subset. For example, if the master model 120 has 1000 weights, a local model 120 may have 100 or 200 weights of the 1000, but all the local models 120 combined represent the full 1000 weights.

The snapshot 123 is an older copy of the local model 120 or the local state 122. In some implementations, the training worker 115 copies the local model 120 or the local state 122 to the snapshot 123 before each round of training. In some implementations, a round of training may be running one training example through the local model 120 and/or the local state 122. In some implementations, a round of training may be running a predetermined number of training examples through the local model 120 and/or the local state 122. In some implementations, a round of training may be a predetermined amount of time, e.g., a few seconds. In some implementations, copying the local model 120 or the local state 122 to the snapshot 123 may include only copying some of the weights to the snapshot 123. In some implementations, the training worker 115 copies the local model 120 or the local state 122 to the snapshot 123 before applying a real-time update, e.g., updated weights 134. The training worker 115 uses the received training example to train the local model 120 and/or update the local state 122, e.g., by running the training example through the local model 120 in a training mode. The training mode causes the local model 120 to adjust the weights of the model to better fit the training example provided. The training workers 115 may all run the local model 120 exclusively in training mode. Each training worker 115 uses the snapshot 123 to determine which changes have the biggest impact as a result of training. Thus, after a round of training, the training worker 115 compares the weights in the local model 120 or the local state 122 with the corresponding weights in the snapshot 123 to identify delta updates 124. Delta updates 124 may be weights that either have an absolute value that satisfies (meets or exceeds) a threshold or weights that have experienced a change over time that satisfy a threshold. In some implementations, the delta updates can be final weights. In some implementations, the delta updates can be intermediate weights, e.g., from the local state 122. In some implementations, the delta updates can be a combination of final and intermediate weights. In some implementations, the delta updates can be results that can be converted into weights. The delta updates 124 can also be referred to as model updates. The training worker 115 sends the delta updates 124 to a parameter server 130. Each training worker 115 in the plurality of training workers sends its delta updates 124 to the parameter server 130. Because each training worker 115 receives different training examples, the delta updates 124 from the training workers 115 differ from each other.

The training dispatcher 110 may also provide the training traffic 105 to an observation worker 140. The observation worker 140 safeguards the master model 120 by enabling the system to determine when the training is beginning to degrade the quality of the model due to the real-time training examples. The observation worker 140 has a local copy of the machine-learned model 120. The observation worker 140 runs the provided training examples through its local copy of the model 120 in a serving mode. In a serving mode, the machine-learned model 120 does not perform weight updates, but does provide an output, e.g., a prediction. In some implementations, during online training the observation worker 140 runs exclusively in a serving mode, receiving and applying model updates (real-time, full, and initial) from the parameter server 130. After running the training example through the model 120, the observation worker 140 produces a metric that quantifies the model quality. An example metric is relative log loss, although other similar metrics can be used. The observation worker 140 sends the metric 146 to a quality assurance agent 160. The quality assurance agent 160 may be an internal connector that communicates with the observation worker 140 and the training workers 115. The quality assurance agent 160 also receives a metric 126 from the training workers. The quality assurance agent 160 compares the metrics to determine whether there is any degradation in the model quality. For example, if the metric 126 differs too much from the metric 146, the quality assurance agent 160 may send an alert. In some implementations, the alert will notify an administrator to manually disable the training. In some implementations, the alert will cause the parameter server 130 to stop the training process, or in other words to stop providing updates. In this manner the observation worker 140 helps the system avoid harmful or undesired changes to the model 120 from being pushed to the prediction workers 150. Although system 100 is illustrated with one observation worker 140, implementations may have one or two additional observation workers 140 which each operate in a similar manner. In some implementations, the training dispatcher 110 hashes the training traffic 105 to the observation workers 140 in a manner similar to that described above for the training workers 115.

The parameter server 130 receives the delta updates 124 from the training workers 115 and aggregates the delta updates 124 into a master copy of the model 120. In some implementations, the parameter server 130 converts the delta updates 124 into weights before aggregating into the master copy of the model 120. Thus, the parameter server 130 maintains a master copy of the model 120. After aggregating the delta update 124 into the master model 120, the parameter server sends the updated weights 134 back to the training worker 114 that provided the delta update 124. The training worker 114 then updates its local copy of the model 120, and/or its local snapshot 123, with the updated weights 134.

The parameter server 130 maintains this master model 120 and provides all the other workers, e.g., the observation worker 140, the training workers 115, and the prediction workers 150, with updates to the master model 120. The parameter server 130 provides three different kinds of updates. The first kind of update is a full update. A full update replaces all weights in the model 120. Thus, the updated weights 134 and 136 provided to each local model 120 in a full update represent all weights in the master model 120. The parameter server 130 may push a full update to the workers periodically, e.g., every few hours. However, updating the models with a full update is computationally expensive, so the recurring period for a full update is very long in comparison to how frequently the parameter server 130 receives delta updates 124 for the master model 120, e.g., hours as opposed to seconds. When the parameter server 130 provides a full update, the parameter server also updates its local snapshot of the model 121 to match the full update. In implementations where the training workers 115 store a partial model, the updated weights 134 are specific for a training worker 115. In other words, a first training worker 115 that has weights 0-99 (i.e., weights in array positions 0 through 99) receives updated weights 134 for weights 0-99 and a second training worker 115 that has weights 100-199 receives updated weights 134 for weights 100-199, etc. In implementation where the training workers 115 have a full copy of the model, the updated weights 134 are the similar as updated weights 136.

The second kind of update provided by the parameter server 130 is an initial update. An initial update is an update for a worker (i.e., observation worker 140, training worker 115, or prediction worker 150) that is coming back online. Because the worker has been offline, the worker's local model 120 may be out of date and the worker may request an initial update from the parameter server 130 before receiving input. Because the system 100 may include thousands of prediction workers 150 in addition to the observation worker and the tens or hundreds of training workers 115, any number of workers can be coming online at any given time. To ensure that the initial update is fast, the parameter server 130 may provide a partial update, e.g., an update of only those weights with the largest absolute value. In some implementations, the most change may be a measure of the absolute value of a weight. For example, the system may compare the absolute value of the weight with an absolute value threshold. If the absolute value of the weight satisfies the absolute value threshold, the system includes the weight in the initial update. In some implementations, the absolute value threshold may chosen based on a fixed percentage of weights to be sent, e.g., so that only 10% of the weights are provided in the initial update, with the absolute value threshold value selected to reach this objective. In some implementations, the absolute value threshold may be based on a predefined impact measured by model quality while running an offline simulation of the model. Accordingly, the absolute value threshold may be determined on a case-by-case basis. In other words, the parameter server 130 selects weights with an absolute value that satisfies (meets or exceeds) absolute value threshold and provides those weights in the initial update. The initial update can be represented by updated weights 134 sent to the training workers 115 or updated weights 136 sent to the prediction workers 150 and the observation worker 140. If the training workers 115 each have a portion of the master model 120, the updated weights 134 for a particular training worker 115 include only the weights assigned to the particular training worker 115. The initial update is provided in response to a request for the initial update from a worker and, therefore, is not a recurring update the way that the full update or a real-time update is. In some implementations the initial update may include weights that have experienced a high change rate.

The third kind of update provided by the parameter server 130 is a real-time update. The real-time updates may be pushed to the prediction workers 150 and the observation worker 140 periodically, e.g., every few seconds. Thus, the period for a real-time update is much shorter (seconds) than the period for the full update (hours). The real-time update does not include all of the weight changes made to the master model 120 since the last real-time update. Rather, the parameter server 130 determines the weights that have had the most change and provides those weights as the real-time update, e.g., as updated weights 136. In some implementations, the parameter server 130 may compare the values of the weights in the master model 120 with the value of the weight in the snapshot 121. This represents a change rate for the weight. The parameter server 130 may provide the updated value of a weight in the updated weights 134 when the change rate for that weight satisfies (meets or exceeds) a threshold. In some implementations, the parameter server 130 may also use an absolute value comparison, e.g., including weights that have an absolute value that satisfies an absolute value threshold, as described above. The threshold for the change rate may be the same or different than the absolute value threshold. In some implementations, the threshold(s) for determining the real-time update may or may not be the same as the threshold(s) used to determine the initial update. In some implementations, the parameter server 130 may update its local copy of the snapshot 121 with the real-time update.

The system may also include a plurality of prediction workers 150. The system may include thousands of prediction workers 150 to accommodate a large number of client requests. Each prediction worker 150 includes a local copy of the model 120. The prediction workers 150 receive requests from clients with input data that the prediction worker 150 provides to its local copy of the model 120. The prediction worker 150 returns the prediction or other output from the model 120 to the requesting client. Thus, the local model 120 of the prediction worker 150 operates exclusively in a serving mode. In some implementations, the local model 120 is hosted within the memory for the particular instance of the prediction worker 150. The prediction workers 150 receive no training traffic 105. Rather, the local model 120 of a prediction worker 150 is kept up-to-date by the real-time updates, initial updates, and full updates provided by the parameter server 130, which is based on the training of the local models 120 on the training workers 115.

Although discussed as providing a prediction, the model 120 may represent any type of machine-learning model that performs a task on given input. In general, a machine-learned model operates on an interconnected group of nodes, each node representing an artificial neuron. The nodes are connected to each other in layers, with the output of one layer becoming the input of a next layer. The model transforms an input, received by the input layer, through a series of hidden layers and produces an output via the output layer. Each layer is made up of a subset of the set of nodes. During training (e.g., training mode), each node tries to find the optimal value for weights in an objective function that results in the correct or optimal output. For example, given input x the model learns which weights provide the correct answer y. Nodes in the output layer provide the transformed input to the requesting process. The weights of the model may be stored in an array so that each weight, whether intermediate or final, has an assigned entry in the array. Accordingly, when the training worker 115 provides delta updates 124 the array position of each weight is also provided. Likewise, the updated weights 134 include an indication of the array position so that each worker knows how to update its local copy of the model. After sufficient training, the model can be used in serving mode.

Although not illustrated in FIG. 1, one or more of the components of the online training system 100 may be in communication with each other over a network. For example, one or more of the observation worker 140, the training workers 115, the parameter server 130, and the prediction workers 150 may be running on distributed computing devices in communication with each other. In addition, the online training system may be in communication with one or more client(s) over the network. The clients may request predictions from the prediction workers 150 and receive the prediction over the network. The network may be for example, the Internet or the network can be a wired or wireless local area network (LAN), wide area network (WAN), etc., implemented using, for example, gateway devices, bridges, switches, and/or so forth. In some implementations, online training system 100 may be in communication with or include other computing devices that provide the training traffic 105. Online training system 100 represents one example configuration and other configurations are possible. In addition, components of system 100 may be combined or distributed in a manner differently than illustrated. For example, in some implementations, the quality assurance agent 160 may be combined with the observation worker 140. In some implementations the workers, e.g., prediction workers 150, training workers 115, and observation worker 140, may be distributed between two or more modules or engines.

Figure 2:
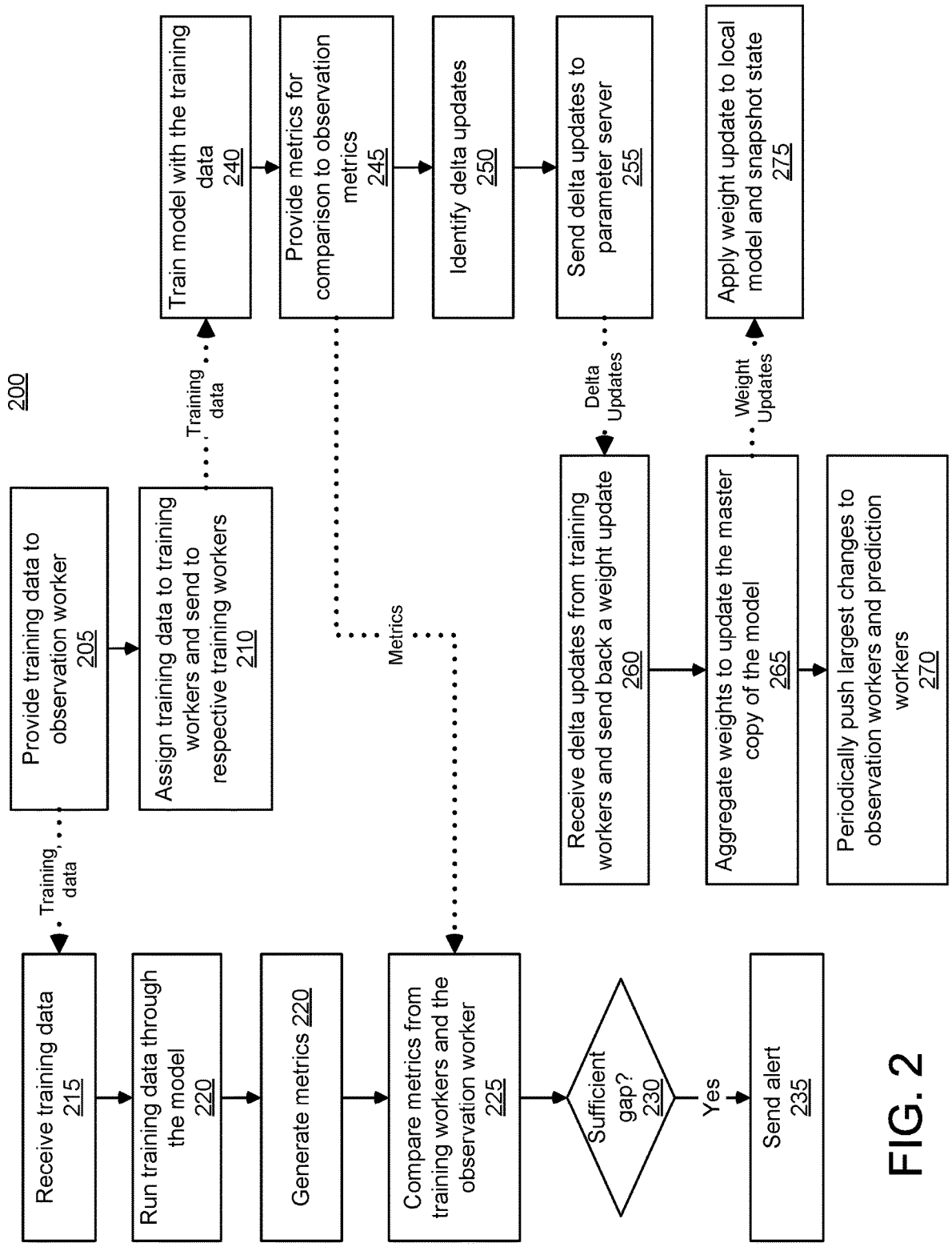
FIG. 2 is a flow diagram of an example process for efficient online training in an machine-learning system, according to an implementation.

FIG. 2 illustrates a flow diagram of an example process 200 for efficient online training in an machine-learning system, according to an implementation. Process 200 may be performed by an online training system, such as system 100 of FIG. 1. The process 200 may minimize the amount of network traffic consumed by the online training system by separating the training function and the inference function. However, in order to ensure that the distributed training examples do not degrade the model, the system may also use an observation worker as a baseline for model quality. As described below, different portions of process 200 may be performed by different workers or agents. Moreover, process 200 is understood to be an ongoing, real-time process.

Process 200 begins with obtaining training data. The system provides the training data to an observation worker (205). The observation worker thus receives a copy of each training example provided to the system. In some implementations, there may be a few instances of the observation worker. In such implementations, the training data may be partitioned to the observation workers in a manner similar to that described above with regard to the training workers. The system also dispatches the training data to training workers. In dispatching the training data, the system assigns each of the training examples to one of the training workers (210). The system sends that training example to its assigned training worker. Thus, although the system may have many training workers, only one or a few of the training workers receives a copy of any particular training example. This greatly reduces network traffic compared with systems that send a copy of each training example to each worker for training. As training examples are obtained they are thus provided to an observation worker and one of the training workers.

The observation worker receives the training data (215) and runs the training examples through a local copy of a machine-learned model (220). The system runs the training example through the local copy in an serving mode, so that no weights are updated. The system generates a metric, such as relative log loss, as a result of running the training example through the model (220). The system may compare this metric with metrics received from the training workers, which are generated during training of the models (225). If the comparison of the metrics demonstrates a sufficient gap between the metrics (230, Yes), the system may send an alert (235). In some implementations, the alert may be sent to an administrator. In some implementations, once an alert is sent the system may stop pushing real-time updates to the workers, e.g., as part of step 270 described below. If there is not a sufficient gap, the system may not send any alert and may continue online training and serving of the model. The system may continually monitor the metrics as the online training progresses.

The training workers may train the model with the training data they receive (240). Each training worker has a local copy of the model and a snapshot state. The snapshot is a version of the state or model. Updating the model includes running a training example through the local copy of the model in a training mode, modifying the weights in the model so that the model provides the expected output indicated in the training example. As part of running the training example through the model, metrics are generated and provided for comparison, as discussed above with regard to step 225. These metrics may be provided for comparison with the metrics generated by the observation worker (245). In some implementations, the metrics are provided to a quality assurance agent. In addition, the training worker compares the weights of the local model or local state after training with the weights of the snapshot (250) to identify delta updates. Delta updates may be weights that either have an absolute value that satisfies (meets or exceeds) a threshold or weights that have experienced a change over time that satisfy a threshold. In some implementations, the delta updates can be final weights. In some implementations, the delta updates can be intermediate weights, e.g., from the local state. In some implementations, the delta updates can be a combination of final and intermediate weights. In some implementations, the delta updates can be results that can be converted into weights. This comparison illustrates which weights have changed. In some implementations this comparison may be done after a training batch. A training batch can be running one training example through the model. A training batch can be running a predetermined number of training examples through the model. A training batch can be a period of time, e.g. a few seconds. The system provides significant weight changes as delta updates to a parameter server (255). In some implementations, weights that have an absolute value that satisfies a threshold (i.e., meets or exceeds the threshold) are considered significant. In some implementations, weights that have a rate of change that satisfies a threshold are significant, the rate of change representing a change in the weight between the local model and the snapshot. In some implementations, after the training worker provides the delta updates to the parameter server, the training worker updates the local copy of the snapshot with the local copy of the model.

The system, e.g., a parameter server, receives the delta updates from the training workers (260). When a delta update is received from a training worker, the system aggregates the update into a master copy of the machine learned model (265). In some implementations, the parameter server converts the delta update into weights before aggregating into the master copy of the model. The system then provides the updates to the master copy to the training worker that provided the delta update, and the training worker updates its local model and its snapshot state using the updated weights (275).

Periodically the system may push a real-time update to the prediction workers and the observation worker (270). In some implementations, the system determines the weights with the most change and pushes those weights to the workers. This is a real-time update that occurs every few seconds to keep the prediction workers, which have a local copy of the model, up-to-date. However, to minimize network bandwidth, the system does not send every weight change in a real-time update. Rather, the system determines which weight updates are significant. In some implementations, the weights with a rate of change that satisfies a threshold are considered significant. This makes the real-time update much smaller than the full model, resulting in less use of network bandwidth and faster update at the workers. In some implementations, weights with an absolute value change that satisfies a threshold may be included in the real-time update. Occasionally, e.g., every few hours, the system may also push a full update of the master copy of the model to the workers. The full update may cause each of the local copies to match the master copy.

Figure 3:
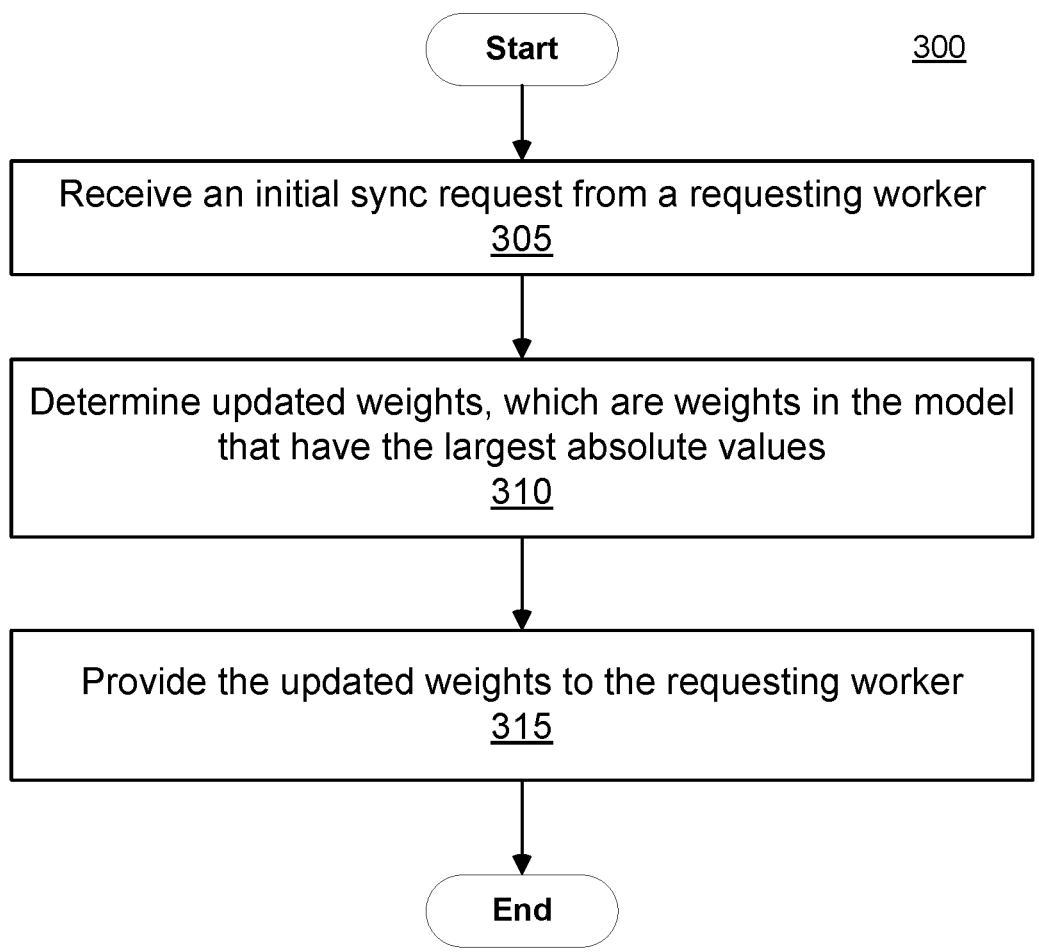
FIG. 3 is a flow diagram of an example process for generating an initial update of the model in an online learning system, according to an implementation.

FIG. 3 illustrates a flow diagram of an example process 300 for generating an initial update of the model in an online learning system, according to an implementation. An initial update differs from the real-time and full updates discussed above with regard to FIG. 2. The initial update is provided in response to a request by a specific worker (e.g., a prediction worker, a training worker, or an observation worker). Thus, the system (e.g., a parameter server) may receive the request from the requesting worker (305). The system determines which weights to include in the initial update (310). The weights included in the initial update may be weights with highest change. In some implementations, weights with an absolute value that satisfies a threshold are weights with highest change. In some implementations, the weights with highest change are the weights with highest impact on model quality. For example, the system may select and send as few weight changes as are needed to ensure the model quality does not fall beyond some threshold. The system may identify the weights with highest impact on model quality while running the model in offline simulation. For example, the system may run multiple models through the same set of testing examples, which have not been included in training, and determine which model gives better predictions comparing with the ground truth. The system may note the weights in the model with the best prediction that differ from the other models and note their position in the array. Thus, the system can pre-define weights as having highest impact on the model quality. In some implementations, the weights with a rate of change that satisfy a threshold are weights that have changed most. The system then provides the weights determined to have changed most to the requesting worker (315). These weights may be final weights or intermediate weights. Process 300 then ends.

FIG. 4 illustrates a diagrammatic representation of a machine in the example form of a computing device 400 within which a set of instructions, for causing the machine to perform any one or more of the methodologies discussed herein, may be executed. The computing device 400 may be a mobile phone, a smart phone, a netbook computer, a rackmount server, a router computer, a server computer, a personal computer, a mainframe computer, a laptop computer, a tablet computer, a desktop computer etc., within which a set of instructions, for causing the machine to perform any one or more of the methodologies discussed herein, may be executed. In one implementation, the computing device 400 may present an overlay UI to a user (as discussed above). In alternative implementations, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computing device 400 includes a processing device (e.g., a processor) 402, a main memory 404 (e.g., read-only memory (ROM), flash memory, dynamic random access memory (DRAM) such as synchronous DRAM (SDRAM)), a static memory 406 (e.g., flash memory, static random access memory (SRAM)) and a data storage device 418, which communicate with each other via a bus 430.

Processing device 402 represents one or more general-purpose processing devices such as a microprocessor, central processing unit, or the like. More particularly, the processing device 402 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 402 may also be one or more special-purpose processing devices such as an application specific integrated circuit (ASIC), a field programmable gate array (FPGA), a digital signal processor (DSP), network processor, or the like. The processing device 402 is configured to execute instructions 426 (e.g., instructions for an application ranking system) for performing the operations and steps discussed herein.

The computing device 400 may further include a network interface device 408 which may communicate with a network 420. The computing device 400 also may include a video display unit 410 (e.g., a liquid crystal display (LCD) or a cathode ray tube (CRT)), an alphanumeric input device 412 (e.g., a keyboard), a cursor control device 414 (e.g., a mouse) and a signal generation device 416 (e.g., a speaker). In one implementation, the video display unit 410, the alphanumeric input device 412, and the cursor control device 414 may be combined into a single component or device (e.g., an LCD touch screen).

The data storage device 418 may include a computer-readable storage medium 428 on which is stored one or more sets of instructions 426 (e.g., instructions for the application ranking system) embodying any one or more of the methodologies or functions described herein. The instructions 426 may also reside, completely or at least partially, within the main memory 404 and/or within the processing device 402 during execution thereof by the computing device 400, the main memory 404 and the processing device 402 also constituting computer-readable media. The instructions may further be transmitted or received over a network 420 via the network interface device 408.

While the computer-readable storage medium 428 is shown in an example implementation to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media and magnetic media. The term "computer-readable storage medium" does not include transitory signals.

In the above description, numerous details are set forth. It will be apparent, however, to one of ordinary skill in the art having the benefit of this disclosure, that implementations of the disclosure may be practiced without these specific details. Moreover, implementations are not limited to the exact order of some operations, and it is understood that some operations shown as two steps may be combined and some operations shown as one step may be split. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying," "determining," "calculating," "updating," "transmitting," "receiving," "generating," "changing," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Implementations of the disclosure also relate to an apparatus for performing the operations herein. This apparatus may be specially constructed for the required purposes, or it may comprise a general purpose computer selectively activated or reconfigured by a computer program stored in the computer. Such a computer program may be stored in a non-transitory computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory, or any type of media suitable for storing electronic instructions.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present disclosure is not described with reference to any particular programming language. It will be appreciated that a variety of programming languages may be used to implement the teachings of the disclosure as described herein.

According to one aspect, a system includes at least one processor, a plurality of prediction workers, a plurality of training workers, and a parameter server. Each prediction worker is configured to store a respective local copy of a machine-learned model, receive a request from a client for a prediction, the request including input data, generate the prediction by running the input data through the model, and provide the request to the client. Each training worker is configured to store a respective local copy of the machine-learned model or a local copy of a state of the machine-learned model, store a respective snapshot of the machine-learned model or the state of the machine-learned model, receive a training example, train the local copy of the machine-learned model, and periodically send one or more delta updates to a parameter server after training by comparing the local copy of the machine-learned model or the local copy of the state with the snapshot. The parameter server is configured to receive the delta updates from the plurality of training workers, aggregate the delta updates into a master copy of the machine-learned model to generate aggregated updates, and send the aggregated updates back to training workers. The parameter server is further configured to, on a first periodic basis, determine a subset of weights for a real-time update, the subset being less than all of the weights for the master copy and the subset including weights having a change that satisfies a threshold, and provide the subset of weights as a real-time update to each of the plurality of prediction workers. On a second periodic basis, the parameter server is configured to provide a full update of the master copy to each of the plurality of prediction workers and to each of the plurality of training workers, the full update being used to replace each respective local copy. The first period occurs at least an order of magnitude more frequently than the second period.

These and other aspects can include one or more of the following features. For example, the first period is measured in seconds and the second period is measured at least in hours. As another example, the change is a rate of change over time. As another example, each of the plurality of training workers may be further configured to send first metrics to a quality assurance agent, and the system further includes an observation worker that is configured to store a respective local copy of a machine-learned model, receive the training example, generate a prediction by running the training example through the local copy of the machine-learned model, and provide second metrics the quality assurance agent based on the generating, wherein the parameter server is configured to provide the observation worker with the real-time update and the full update and wherein the quality assurance agent provides an alert when a difference between the first metrics and the second metrics satisfies a threshold. In some implementations, the parameter server may be further configured to, responsive to the alert, cease providing the real-time update to each of the plurality of prediction workers. As another example, the parameter server may be further configured to receive a request for an initial update from a requesting worker, the requesting worker being one of the plurality of prediction workers, determine a second set of weights having a change that satisfies a second threshold, and provide the second set of weights to the requesting worker. The change that satisfies a second threshold may be an absolute change and/or the second set of weights may be weights identified as with highest impact on model quality. As another example, each respective local copy of the machine-learned model may be a subset of the master copy.

In one aspect, a method includes receiving training data, providing the training data to an observation worker and to a training worker of a plurality of training workers, the observation worker and each of the training workers having a respective local copy of a machine-learned model, generating first metrics for the training data from the observation worker by running the training data through the respective local copy of the machine-learned model in an serving mode, generating second metrics for the training data from the training worker by running the training data through the a machine-learned model in a training mode, and sending an alert when a difference between the first metrics and the second metrics satisfies a threshold. In some implementations, the method may also include on an iterative basis, receiving at a parameter server delta updates from the plurality of training workers, the delta updates being related to changes in weights for the model, updating a master copy of the model using the delta updates, determining, from among all weights for the master copy of the model, a set of updated weights, the set representing less than all weights in the master copy, and providing the set of updated weights to the observation worker and to each of a plurality of prediction workers, each prediction worker running a local copy of the model in an serving mode.

These and other features may include one or more of the following features. For example, the method may also include ceasing, responsive to the alert, to provide the set of updated weights to the plurality of prediction workers. As another example, providing the training data to the training worker can include generating a hash value using the training data, and determining the hash value corresponds to the training worker.

In one aspect, a method includes receiving delta updates from a training worker of a plurality of training workers. Each of the training workers is configured to store a respective local copy of a machine-learned model, store a respective snapshot of the machine-learned model, receive a training example, train the local copy of the machine-learned model, and periodically send one or more delta updates to a parameter server after training by comparing the local copy of the machine-learned model or a local state with the snapshot. The method also includes aggregating the delta update into a master copy of the machine-learned model and providing weights changed in the aggregating to the training worker. The method also includes, on a first periodic basis, determining a subset of weights for a real-time update, the subset being less than all of the weights for the master copy and the subset including weights having a change that satisfies a threshold and providing the subset of weights as a real-time update to each of a plurality of prediction workers, each of the plurality of prediction workers storing a respective local copy of the machine-learned model and running the respective local copy in an serving mode in response to a client request. The method also includes, on a second periodic basis, providing a full update of the master copy of the machine-learned model to each of the plurality of prediction workers and to each of the plurality of training workers, wherein the full update is used to replace each respective local copy. The first period occurs at least an order of magnitude more frequently than the second period.

These and other aspects can include one or more of the following features. For example, the change is a rate of change over time. As another example, the method may also include receiving a request for an initial update from a requesting worker, the requesting worker being one of the plurality of prediction workers, determining a second set of weights having a change that satisfies a second threshold, and providing the second set of weights to the requesting worker. As another example, the change that satisfies a second threshold may be a measure of the absolute value of the weight. As another example, the second threshold is set so that a fixed percentage of weights are included in the initial update. As another example, the real-time update may occur every few seconds and the full update occurs every few hours. As another example, providing the subset of weights includes sending the subset to an observation worker, the observation worker running training examples through a respective local copy of the model in an serving mode to generate first metrics and each of the training workers generate second metrics during training and the method further includes comparing the first metrics to the second metrics and generating an alert when a difference between the first metrics and the second metrics satisfies a threshold. As another example, each of the plurality of prediction workers exclusively run the respective local copy of the model in serving mode. As another example, each of the plurality of training workers exclusively run the respective local copy of the model in training mode.

In one aspect, a system includes at least one processor and memory storing instructions that, when executed by the at least one processor cause the system to perform any of the processes or methods disclosed herein.

What is claimed is:
1. A system comprising:
at least one processor;
a plurality of prediction workers, each prediction worker being executable by the at least one processor and being configured to:

store a respective local copy of a machine-learned model,
receive a request from a client for a prediction, the request including input data,
generate the prediction by running the input data through the local copy of the machine-learned model without updating the local copy, and
provide the prediction for the input data to the client;
a plurality of training workers, each training worker being executable by the at least one processor and being configured to:
store a respective local copy of the machine-learned model or a local copy of a state of the machine-learned model,
store a respective snapshot of the machine-learned model or the state of the machine-learned model,
receive training examples,
train the local copy of the machine-learned model using the training examples, and
periodically send one or more delta updates to a parameter server after training, the delta updates representing differences between the snapshot and the local copy of the machine-learned model or the local copy of the state; and
the parameter server, the parameter server being configured to:
receive the delta updates from the plurality of training workers,
aggregate the delta updates into a master copy of the machine-learned model to generate aggregated updates,
send the aggregated updates back to training workers,
on a first periodic basis provide a real-time update by:
determining a subset of weights for a real-time update, the subset being less than all of the weights for the master copy and the subset including weights having a change that satisfies a threshold, and
providing the subset of weights as a real-time update to each of the plurality of prediction workers, and
on a second periodic basis, provide a full update of the master copy to each of the plurality of prediction workers and to each of the plurality of training workers, wherein the full update is used to replace each respective local copy,
wherein the first periodic basis occurs at least an order of magnitude more frequently than the second periodic basis.

2. The system of claim 1, wherein the first period is measured in seconds and the second period is measured at least in hours.

3. The system of claim 1, wherein the change is a rate of change over time.

4. The system of claim 1, each of the plurality of training workers being further configured to send first metrics to a quality assurance agent, the quality assurance agent being executable by the at least one processor, and the system further comprises:
an observation worker being executable by the at least one processor and being configured to:
store a respective local copy of a machine-learned model;
receive the training examples;
generate a prediction by running the training examples through the local copy of the machine-learned model; and
provide second metrics the quality assurance agent based on the generating,
wherein the parameter server is configured to provide the observation worker with the real-time update and the full update, and
wherein the quality assurance agent provides an alert when a difference between the first metrics and the second metrics satisfies a second threshold.

5. The system of claim 4, the parameter server is further configured to, responsive to the alert, cease providing the real-time update to each of the plurality of prediction workers.

6. The system of claim 1, the parameter server being configured to:
receive a request for an initial update from a requesting worker, the requesting worker being one of the plurality of prediction workers;
determine a second set of weights having a change that satisfies a second threshold; and
provide the second set of weights to the requesting worker.

7. The system of claim 6, wherein the change that satisfies the second threshold is an absolute change.

8. The system of claim 6, wherein the second set of weights are weights identified as with highest impact on model quality.

9. The system of claim 1, wherein each respective local copy of the machine-learned model is a subset of the master copy.

10. A method comprising:
receiving training data;
providing the training data to an observation worker and to a training worker of a plurality of workers, the observation worker and the training worker each having a respective local copy of a machine-learned model and each being executable by at least one processor;
receiving, at a parameter server, delta updates from the plurality of training workers, the delta updates being related to changes in weights for the machine-learned model, wherein the parameter server provides, on a first periodic basis, a subset of weights for a real-time update to the observation worker and to a plurality of prediction workers and provides, on a second periodic basis, a full update of weights to the observation worker and to the plurality of prediction workers, wherein the plurality of prediction workers run a local copy of the machine-learned model in a serving mode to provide a response to a input without updating the local copy of the machine-learned model;
generating first model quality metrics for the training data using the observation worker by the observation worker running the training data through the local copy of the machine-learned model in a serving mode without updating the local copy of the machine-learned model;
generating second model quality metrics for the training data from the training worker by the training worker running the training data through the local copy of the machine-learned model in a training mode that updates the local copy of the model; and
sending an alert when a difference between the first model quality metrics and the second model quality metrics satisfies a threshold.

11. The method of claim 10, wherein the first periodic basis occurs at least an order of magnitude more frequently than the second periodic basis.

12. The method of claim 10, further comprising ceasing, responsive to the alert, to provide the real-time update of a subset of weights to the plurality of prediction workers.

13. The method of claim 10, wherein providing the training data to the training worker includes:
generating a hash value using the training data; and
determining the hash value corresponds to the training worker.

14. The method of claim 10, wherein the observation worker is one of at least two observation workers and the method includes hashing the training data to assign the training data to one of the at least two observation workers.

15. A method comprising:
receiving delta updates from a training worker of a plurality of training workers, each training worker of the plurality of training workers being executable by a processor and being configured to:
store a respective local copy of a machine-learned model,
store a respective snapshot of the machine-learned model,
receive training examples,
train the local copy of the machine-learned model using the training examples, and
periodically send one or more delta updates to a parameter server after training, the delta updates representing differences between the snapshot and the local copy of the machine-learned model or a local state;
aggregating the delta updates into a master copy of the machine-learned model;
providing weights changed in the aggregating to the training worker;
on a first periodic basis:
determining a subset of weights for a real-time update, the subset being less than all of the weights for the master copy and the subset including weights having a change that satisfies a threshold, and
providing the subset of weights as a real-time update to each of a plurality of prediction workers, each of the plurality of prediction workers being executable by a processor and storing a respective local copy of the machine-learned model and running the respective local copy in a serving mode without updating the local copy of the machine-learned model in response to a client request for an output from the model; and
on a second periodic basis, providing a full update of the master copy of the machine-learned model to each of the plurality of prediction workers and to each of the plurality of training workers, wherein the full update is used to replace each respective local copy,
wherein the first periodic basis occurs at least an order of magnitude more frequently than the second periodic basis.

16. The method of claim 15, wherein the change is a rate of change over time.

17. The method of claim 15, further comprising:
receiving a request for an initial update from a requesting worker, the requesting worker being one of the plurality of prediction workers;
determining a second set of weights having a change that satisfies a second threshold; and
providing the second set of weights to the requesting worker.

18. The method of claim 17, wherein the change that satisfies the second threshold is a measure of the absolute value of the weight.

19. The method of claim 17, wherein the second threshold is set so a fixed percentage of weights are included in the initial update.

20. The method of claim 15, wherein the real-time update occurs every few seconds and the full update occurs every few hours.

21. The method of claim 15, wherein providing the subset of weights includes sending the subset to an observation worker, the observation worker running training examples through a respective local copy of the model in a serving mode to generate first metrics and each of the training workers generating second metrics during training and the method further includes:
comparing the first metrics to the second metrics; and
generating an alert when a difference between the first metrics and the second metrics satisfies a second threshold.

22. The method of claim 15, wherein each of the plurality of prediction workers always run the respective local copy of the model in serving mode and each of the plurality of training workers always run the respective local copy of the model in training mode.

23. The method of claim 15, wherein the number of prediction workers in the plurality of prediction workers is at least an order of magnitude higher than the number of training workers in the plurality of training workers.

* * * * *